United States Patent [19]
Haszler et al.

[11] Patent Number: 6,153,854
[45] Date of Patent: Nov. 28, 2000

[54] ALUMINUM SHEET PRODUCT AND METHOD OF WELDING STRUCTURAL COMPONENTS

[75] Inventors: Alfred Johann Peter Haszler, Vallendar; Guido Weber, Andernach, both of Germany

[73] Assignee: Corus Aluminium Walzprodukte GmbH, Koblenz, Germany

[21] Appl. No.: 09/254,549

[22] PCT Filed: Dec. 19, 1997

[86] PCT No.: PCT/EP97/07274

§ 371 Date: Dec. 1, 1999

§ 102(e) Date: Dec. 1, 1999

[87] PCT Pub. No.: WO98/28130

PCT Pub. Date: Jul. 2, 1998

[30] Foreign Application Priority Data

Dec. 20, 1996 [EP] European Pat. Off. ............. 96203664

[51] Int. Cl.⁷ .................................................. B23K 26/00
[52] U.S. Cl. .............................. 219/121.64; 219/121.63; 219/121.6; 219/121.65; 219/121.66
[58] Field of Search ......................... 219/121.64, 121.63, 219/121.65, 121.66; 148/688, 711, 437; 428/654, 650

[56] References Cited

U.S. PATENT DOCUMENTS 3,963,453  6/1976  Singleton, Jr. .
4,410,370  10/1983  Baba et al. ......................... 148/11.5 A
4,426,429  1/1984  Di Russo et al. ...................... 428/654
5,213,639  5/1993  Colvin et al. ........................... 148/693
5,723,221  3/1998  Brooker et al. ......................... 428/469

FOREIGN PATENT DOCUMENTS 0066009  12/1982  European Pat. Off. .
0117352  9/1984  European Pat. Off. .
1010072  6/1952  France .

OTHER PUBLICATIONS

Dickerson, Paul B. and Irving, Bob, "Welding Aluminum: It's Not As Difficult As It Sounds" *Welding Journal Including: Welding Research*, vol. 71, No. 4, Apr. 1, 1992, pp. 45–50.

*Primary Examiner*—Patrick Ryan
*Assistant Examiner*—M. Alexandra Elve
*Attorney, Agent, or Firm*—Stevens, Davis, Miller & Mosher, LLP

[57] ABSTRACT

In the welding of aluminum alloy, structural components, e.g. in the aerospace industry, one of the welded components is a sheet product having a core and a clad layer of filler material. During welding, the clad layer provided filler for the welding pool, and the core remains substantially unmelted. Consequently, adhesion between the core and the clad layer maintains its strength, e.g. keeps at least 80% of its pre-welding strength.

23 Claims, 1 Drawing Sheet

ALUMINUM SHEET PRODUCT AND METHOD OF WELDING STRUCTURAL COMPONENTS

FIELD OF THE INVENTION

The invention relates to an aluminium sheet product, suitable for use as a structural component in welded construction, and to welded constructions made from the aluminium sheet product. The invention also relates to methods of welding aluminium alloy structural components. The invention is especially applicable to the welding of aluminium alloy structural components in ships and in the aerospace industry.

DESCRIPTION OF THE PRIOR ART

In welded aluminium constructions mostly AA5xxx type Al-alloy materials are used; these alloys have the best mechanical properties of the non-heat-treatable type Al-alloys. Usually the magnesium content of the alloy is kept low to obtain good corrosion resistance. These alloys, also in the strain hardened tempers, are however prone to loss of strength in the heat effected zone.

Heat-treatable AA6xxx type Al-alloy materials are considered use for welded constructions; they suffer however, loss of mechanical properties in the heat affected zone. AA2xxx and AA7xxx type Al-alloys have generally lack of weldability and corrosion resistance.

Particularly in the aerospace industry, it has hitherto been found very difficult to weld aluminium alloy load-bearing structural components used in the outer skin of aircraft, without causing loss of strength. Such allow components must have resistance to impacts. It has been common to join such components by rivetting. There is a desire to replace rivetted joints by welded joints without loss of the integrity of the load-bearing alloy.

Proposals have been made to provide a clad layer on aluminium alloy sheets, in order to increase their weldability. FR-A-1010072 shows a method of resistance welding, in which two sheets are joined face-to-face. Each sheet consists of three alloy layers, one of which has high strength, one is of good weldability and the third has low electrical resistance. The resistance heating effect is concentrated at the weldable layer. EP-A-117352 discloses a welding arrangement intended to provide an air-tight seal in the packaging of semiconductor devices, using laser welding. An intermediate material, such as Al—Si alloy in the form of a clad layer, is interposed between the elements welded by laser irradiation at the weld zone. It appears that the welded elements themselves are substantially melted by the welding, since the intermediate material may be silicon, zinc or nickel metal.

EP-A-66009 describes aluminium alloy composite plates for use as armour plating. A central component of the plate has high strength and hardness, while inner and outer components have high toughness and good weldability. When the plates are joined edge-to-edge, the respective inner components are welded together, using external filler material, as are the respective outer components.

SUMMARY OF THE INVENTION

The object of the invention is to provide a weldable aluminium sheet product, particularly a weldable product based on a type of Al-alloy generally considered to be either weldable with loss of properties or non-weldable, which product can be used in welding constructions without substantial loss of properties.

According to the invention in one aspect there is provided an aluminium sheet product for use as a structural component in a welded construction, comprising a core sheet made of heat treatable aluminium alloy and on at least one side of said core sheet a clad layer adhered to the core sheet, said clad layer being made of an aluminium alloy welding filler material intended to form the welding pool during welding without substantial melting of the core sheet.

The invention further provides a welded construction having at least two aluminium alloy structural components joined by welding, at least one of the components being the aluminium sheet product of the invention, as defined above. Particularly the invention provides such a construction as an automotive vehicle body sheet and in the aerospace and ship-building industries, for example as a part of the outer skin sheet of an aircraft or other aerospace vehicle. In such a construction, the strength, e.g. tensile property such as ultimate tensile strength, of the core sheet can be at least 80% of its strength prior to the welding operation. In this way the structural integrity of the alloy is maintained.

For the purpose of this specification sheet product means a flat rolled product with a thickness of up to 36 mm.

In this aluminium sheet product, at welding the clad layer supplies the filler material, which therefore need not be supplied from the outside. Also only the clad layer of the aluminium sheet product is melted. Thus there is no melting of the core sheet and consequently no cracking in a heat affected zone in the core sheet.

At welding the heat may be kept away from the core sheet as much as possible so that loss of mechanical properties in the core material is prevented. Additionally a corrosion protection can be given by the clad layer, if the corrosion resistance of the core material is not sufficient.

In this aspect the Al-alloy of the core sheet is heat-treatable and more preferably of the AA2xxx, AA6xxx or AA7xxx type. It may be noted that AA2xxx and AA7xxx type Al-alloys are applicable due to the role of the clad layer. Without the clad layer, such alloys are regarded as difficult to weld.

Suitably the Al-alloy clad layer is made from an Al-alloy filler material known for welding processes.

Preferably the thickness of the core sheet is in the range of up to 30 mm and the thickness of the clad layer is in the range of up to 20% of the thickness of the core sheet. More preferably the thickness of the core sheet is in the range of 0.5–15 mm and the thickness of the clad layer is in the range of 5–15% of the thickness of the core sheet. The thickness of the clad layer should be sufficient to prevent loss of adhesion from the core sheet and to protect the core sheet from the heat affected zone.

Adhesion between the clad layer and the core sheet is very important to obtain structural integrity after welding. Preferably the adhesion is obtained by casting a composite ingot having simultaneously cast contacting portions of respectively the materials of the core sheet and the clad layer, followed by rolling of the ingot. This provides a mainly oxide free interface. Alternatively the adhesion is obtained by rolling.

According to the invention in another aspect, there is provided a method of welding structural components in which a sheet product as first structural component and an aluminium alloy second structural component are joined by welding, wherein said first structural component has a core sheet made of aluminium alloy and adhered to at least one side of said core sheet a clad layer made of aluminium alloy welding filler material, and during welding there is formed a welding pool of molten metal at the welding location from the filler metal of said clad layer and metal of said second component, substantially without melting of said core sheet.

This method provides the advantages stated above, in particular that the strength loss of the core sheet may be minimized, e.g. at least 80% of pre-welding strength may be maintained.

Suitably the heat to form the welding pool is generated by laser or electric arc.

In this aspect the aluminium alloy of the core may be heat-treatable, e.g. of the AA2xxx, AA6xxx or AA7xxx series, or non-heat-treatable, e.g. of the AA5xxx series. Strain hardened non-heat-treatable alloys may be employed.

The preferred thickness of the core and clad, and methods of adhering core and clad described above, apply in this aspect of the invention also.

The invention further provides a welded construction produced by the method of this aspect of the invention, particularly such a construction in the ship or aerospace industries, e.g. a skin sheet of an aircraft.

BRIEF DESCRIPTION OF THE DRAWING

The invention will be explained by means of the drawing in which.

DESCRIPTION OF THE PREFERRED EMBODIMENTS

Figure 1:
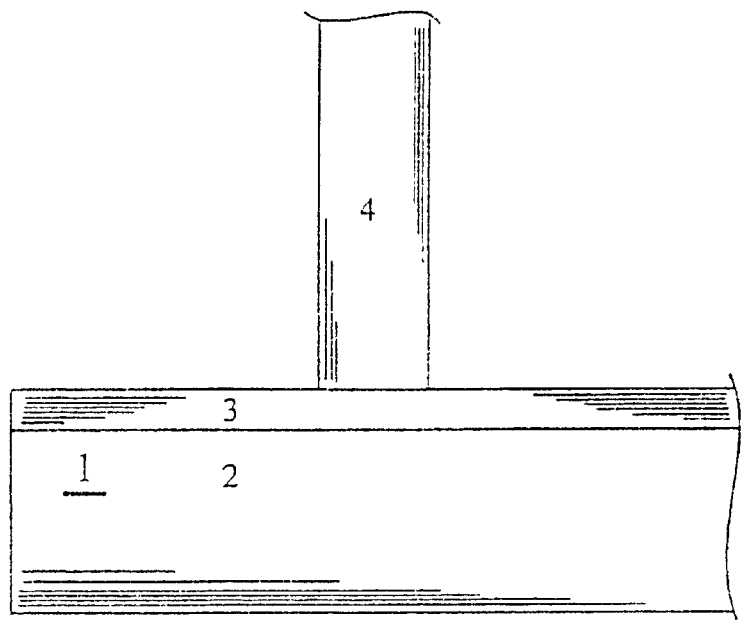
FIG. 1 represents the situation before welding in one embodiment of the invention.

In FIG. 1 there is shown the aluminium sheet product 1 consisting of the core sheet 2 and the clad layer 3. An Al-alloy part 4 is to be welded to this aluminium sheet product. The alloy part 4 has a single homogenous composition.

Figure 2:
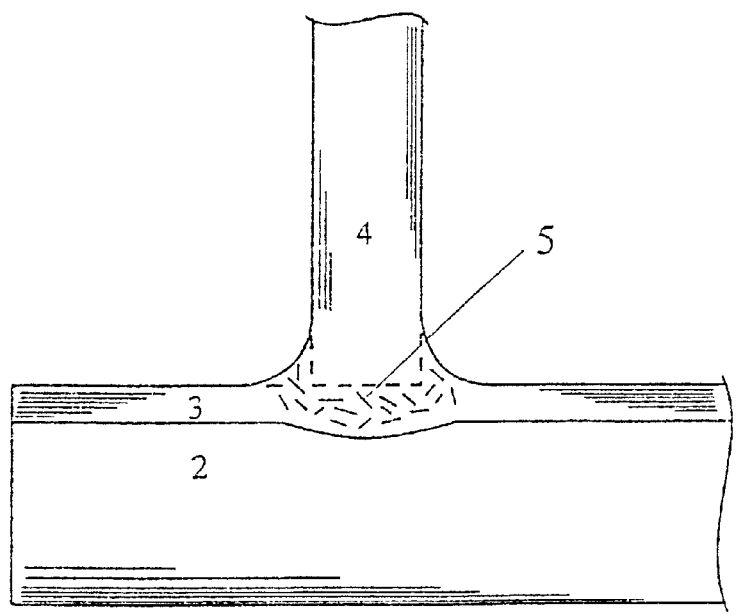
FIG. 2 represents the situation after welding.

In FIG. 2, which represents the situation after welding, it is shown that during welding, e.g. by laser, a pool 5 is formed mainly consisting of molten material from the clad layer 3 and the part 4, and that the core sheet 2 is substantially unaffected, i.e. substantially not melted. In this way also core sheets made from Al-alloys which are considered in the art as badly weldable can be used in welded constructions.

EXAMPLE

An aluminium sheet product 1 in accordance with the invention consisting of a core sheet of AlMgSiCu and a clad layer of AlSi12 and a part 4 (arranged as in FIG. 1) of AlMgSiCu were welded by laser welding.

Welding configuration core sheet : thickness 2.4 mm clad layer : thickness 0.4 mm Weld characterisation Mechanical properties of sheet product 1:

|  | Before Welding | After Welding |
| --- | --- | --- |
| Ultimate tensile strength Rm | 400 MPa | 350 MPa |
| 0.2% yield strength Rp 0.2 | 375 MPa | 340 MPa |

Corrosion properties

Result of the intergranular corrosion test according to MIL H 6088 after welding, relating to the whole welding construction: No JGL, only pitting.

What is claimed is:

1. Us of an aluminium sheet product as a structural component in a welded construction part of a ship or an aerospace vehicle, wherein the aluminium sheet product comprises a core sheet (2) made of heat treatable aluminium alloy and on at least one side of said core sheet a clad layer (3) adhered to the core sheet, said clad layer (3) being made of an aluminium alloy welding filler material intended to form the welding pool during welding without melting of the core sheet.

2. Use of an aluminium sheet product according to claim 1, wherein the alloy of the core sheet (2) belongs to one of the Aluminium Association series AA2xxx, AA6xxx and AA7xxx.

3. Use of an aluminium sheet product according to claim 1, wherein said core sheet (2) has a thickness of not more than 30 mm and said clad layer (3) has a thickness which is not more than 20% of the thickness of the core sheets.

4. Use of an aluminium sheet product according to claim 3, wherein the core sheet (2) has a thickness in the range 0.5–15 mm and the clad layer (3) has a thickness in the range 5–15% of the thickness of the core sheet.

5. Use of an aluminium sheet product according to claim 1, which is formed by casting of a composite ingot having simultaneously cast contacting portion of respectively the materials of the core sheet and the clad layer, followed by rolling of the composite ingot into the sheet product.

6. Use of an aluminium sheet product in according to claim 1, in which the core sheet and clad layer are adhered by rolling.

7. A welded construction which is part of a ship or an aerospace vehicle, having at least one of said components being an aluminium sheet product comprising a core sheet (2) made of heat treatable aluminium alloy and on at least one side of said core sheet a clad layer (3) adhered to the core sheet, said clad layer (3) being made of an aluminum alloy welding filler material intended to form the welding pool during welding without melting of the core sheet.

8. Welded construction according to claim 7, which is a skin sheet of an aircraft.

9. A method of welding structural components in which an aluminium sheet product according to claim 1 is welded to a second aluminium alloy structural component, comprising forming a welding pool of molten metal at the welding location from the filler metal of said clad layer and metal of said second component, without melting of said core sheet.

10. A method according to claim 9, wherein said second component, at least at the welding region, has a single homogenous composition.

11. A method of welding structural components in which a sheet product as first structural component and an aluminium alloy second structural component are joined by welding, wherein said first structural component has a core sheet (2) made of aluminium alloy and adhered to at least one side of said core sheet a clad layer (3) made of aluminium alloy welding filler material, and during welding there is formed a welding pool of molten metal at the welding location from the filler metal of said clad layer and metal of said second component, without melting of said core sheet.

12. A method according to claim 11, wherein heat is applied to form said welding pool by means of a laser or an electric arc.

13. Method according to claim 11, wherein the aluminium alloy of the core sheet is a heat-treatable alloy.

14. Method according to claim 13, wherein the aluminium alloy of the core sheet belongs to one of the Aluminium Association series AA2xxx, AA6xxx and AA7xxx.

15. Method according to claim 11, wherein the aluminium alloy of the core sheet is a non-heat-treatable alloy.

16. Method according to claim 15, wherein the aluminium alloy of the core sheet belongs to the Aluminium Association AA5xxx series.

17. Method according to claim 11 wherein the thickness of the core sheet is not more than 30 mm and the thickness of the clad layer is not more than 20% of the thickness of the core sheet.

18. Method according to claim 11, wherein the thickness of the core sheet is in the range 0.5–15 mm and the thickness of the clad layer is in the range 5–15% of the thickness of the core sheet.

19. Method according to claim 11 wherein the second component is formed by casting of a composite ingot having simultaneously cast contacting portions of respectively the materials of the core sheet and the clad layer, followed by rolling of the composite ingot into the sheet product.

20. Method according to claim 11, wherein in the second component the clad layer and the core sheet are adhered by rolling.

21. Welded construction which is part of a ship or aerospace vehicle, made by a method according to claim 11.

22. Welded construction according to claim 21, which is a skin sheet of an aircraft.

23. Welded construction according to claim 1, wherein said component is a skin sheet of an aircraft.

* * * * *

UNITED STATES PATENT AND TRADEMARK OFFICE
CERTIFICATE OF CORRECTION

PATENT NO. : 6,153,854
DATED : November 28, 2000
INVENTOR(S) : Alfred Johann Peter HASZLER
Guido WEBER It is certified that error appears in the above-identified patent and that said Letters Patent are hereby corrected as shown below:

Claim 1, line1, change "Us" to --Use--.

Signed and Sealed this

Eighth Day of May, 2001

Attest:

NICHOLAS P. GODICI

*Attesting Officer*    *Acting Director of the United States Patent and Trademark Office*